United States Patent
Srivastava et al.

(10) Patent No.: US 7,202,477 B2
(45) Date of Patent: Apr. 10, 2007

(54) SCINTILLATOR COMPOSITIONS OF CERIUM HALIDES, AND RELATED ARTICLES AND PROCESSES

(75) Inventors: Alok Mani Srivastava, Niskayuna, NY (US); Steven Jude Duclos, Clifton Park, NY (US); Holly Ann Comanzo, Niskayuna, NY (US); Qun Deng, Shanghai (CN); Lucas Lemar Clarke, Uniontown, OH (US)

(73) Assignee: General Electric Company, Niskayuna, NY (US)

( * ) Notice: Subject to any disclaimer, the term of this patent is extended or adjusted under 35 U.S.C. 154(b) by 74 days.

(21) Appl. No.: 11/073,110

(22) Filed: Mar. 4, 2005

(65) Prior Publication Data

US 2006/0197023 A1 Sep. 7, 2006

(51) Int. Cl.
*G01T 1/24* (2006.01)
*C09K 11/68* (2006.01)

(52) U.S. Cl. .......... 250/361 R; 252/301.4 H; 423/263; 423/466; 501/152; 501/151; 117/942

(58) Field of Classification Search .......... 250/361 R; 252/301.4 H; 432/263, 466; 501/152, 151; 117/942
See application file for complete search history.

(56) References Cited

U.S. PATENT DOCUMENTS 3,668,143 A * 6/1972 Luckey ............ 252/301.4 R
5,213,712 A 5/1993 Dole
5,319,203 A 6/1994 Anderson et al.
5,869,836 A 2/1999 Linden et al.
5,882,547 A 3/1999 Lynch et al.
6,302,959 B2 * 10/2001 Srivastava et al. ............ 117/81
6,437,336 B1 8/2002 Pauwels et al.
6,585,913 B2 * 7/2003 Lyons et al. ............. 252/301.5

(Continued)

FOREIGN PATENT DOCUMENTS

WO WO/0160944 A2 8/2001

(Continued)

OTHER PUBLICATIONS

"Scintillation Properties of $LaCl_3:Ce^{3+}$ Crystals: Fast, Efficient, and High-Energy Resolution Scintillators", E.V.D. van Loef et al, IEEE Transactions on Nuclear Science, vol. 48, No. 3, Jun. 2001, pp. 341-345.

(Continued)

*Primary Examiner*—Albert Gagliardi
(74) *Attorney, Agent, or Firm*—Francis T. Coppa; Patrick K. Patnode

(57) ABSTRACT

A scintillator composition is disclosed, containing a solid solution of at least two cerium halides. A radiation detector for detecting high-energy radiation is also described herein. The detector includes the scintillator composition mentioned above, along with a photodetector optically coupled to the scintillator. A method for detecting high-energy radiation with a scintillation detector is also described, wherein the scintillation crystal is based on a mixture of cerium halides.

21 Claims, 3 Drawing Sheets

U.S. PATENT DOCUMENTS

| | | |
|---|---|---|
| 6,624,420 B1 | 9/2003 | Chai et al. |
| 6,624,422 B2 | 9/2003 | Williams et al. |
| 7,048,872 B2 * | 5/2006 | Derenzo et al. ...... 252/301.6 R |
| 7,067,815 B2 * | 6/2006 | Dorenbos et al. ...... 250/370.11 |
| 2001/0019241 A1 * | 9/2001 | Srivastava et al. .......... 313/483 |
| 2003/0020044 A1 * | 1/2003 | Lyons et al. ............. 252/301.5 |
| 2004/0149917 A1 | 8/2004 | Dorenbos et al. |
| 2004/0200964 A1 * | 10/2004 | Lefaucheur et al. .... 250/361 R |
| 2005/0082484 A1 | 4/2005 | Srivastava et al. |
| 2006/0104880 A1 * | 5/2006 | Iltis ........................... 423/263 |

FOREIGN PATENT DOCUMENTS

| | | |
|---|---|---|
| WO | WO/0160945 A2 | 8/2001 |
| WO | WO 2004050792 A1 * | 6/2004 |

OTHER PUBLICATIONS

"High-Energy-Resolution Scintillator: $Ce^{3+}$Activated $LaCl_3$", E.V. D. van Loef et al, Applied Physics Letters, vol. 77, No. 10, Sep. 2000, pp. 1467-1468.

"High-Energy-Resolution Scintillator: $Ce^{3+}$Activated $LaBr_3$", E.V. D. van Loef et al, Applied Physics Letters, vol. 79, No. 10, Sep. 2001, pp. 1573-1575.

Influence of the Anion on the Spectroscopy and Scintillation Mechanism in Pure and $Ce^{3+}$-doped $K_2LaX_5$ and $LaX_3$ (X=Cl, Br, I), E.V.D. van Loef et al, Physical Review B 68, 045108 (2003), pp. 045108-1 to 045108-9.

K. S. Shah et al., $CeBr_3$ Scintillators for Gamma-Ray Spectroscopy; IEEE Transactions on Nuclear Science; vol. 52, No. 6, Dec. 2005, pp. 3157-3159.

GB Search Report, GB0603843.4, Jun. 26, 2006.

* cited by examiner

SCINTILLATOR COMPOSITIONS OF CERIUM HALIDES, AND RELATED ARTICLES AND PROCESSES

BACKGROUND OF THE INVENTION

This invention generally relates to scintillator compositions, e.g., those which are useful for detecting gamma-rays and X-rays under a variety of conditions.

Scintillator crystals are widely used in detectors for high-energy radiation, e.g. gamma-rays, X-rays, cosmic rays, and particles characterized by an energy level of greater than about 1 keV. The crystal is coupled with a light-detection means, i.e., a photodetector. When photons from a radionuclide source impact the crystal, the crystal emits light. The photodetector produces an electrical signal proportional to the number of light pulses received, and to their intensity. Scintillator crystals are in common use for many applications. Examples include medical imaging equipment, e.g., positron emission tomography (PET) devices; well-logging for the oil and gas industry, and various digital imaging applications.

The specific composition of the scintillator is critical to the performance of the radiation detection equipment. The scintillator must be responsive to X-ray and gamma ray excitation. Moreover, the scintillator should possess a number of characteristics which enhance radiation detection. For example, most scintillator materials must possess high light output, short decay time, reduced afterglow, high "stopping power", and acceptable energy resolution. (Other properties can also be very significant, depending on how the scintillator is used, as mentioned below).

Those characteristics of high-performance scintillators are well-known in the art. In brief, "light output" is the quantity of visible light emitted by the scintillator after being excited by a pulse of the x-ray or gamma ray. High light output is desirable because it enhances the radiation detector's ability to convert the light into an electric pulse. (The size of the pulse usually indicates the amount of radiation energy).

The term "decay time" refers to the time required for the intensity of the light emitted by the scintillator to decrease to a specified fraction of the light intensity at the time when the radiation excitation ceases. For many applications, such as the PET devices, shorter decay times are preferred because they allow efficient coincidence-counting of gamma rays. Consequently, scan times are reduced, and the device can be used more efficiently.

The term "afterglow" refers to the light intensity emitted by the scintillator at a specified time (e.g., 100 milliseconds) after the radiation excitation ceases. (Afterglow is usually reported as a percentage of the light emitted while the scintillator is excited by the radiation). Reduced afterglow is often advantageous because it results in a sharper image produced by the detector, e.g., one free from image artifacts ("ghost images").

"Stopping power" is the ability of a material to absorb radiation, and is sometimes referred to as the material's "X-ray absorption" or "X-ray attenuation". Stopping power is directly related to the density of the scintillator material. Scintillator materials which have high stopping power allow little or no radiation to pass through, and this is a distinct advantage in efficiently capturing the radiation.

The "energy resolution" of a radiation detector refers to its ability to distinguish between energy rays (e.g., gamma rays) having very similar energy levels. Energy resolution is usually reported as a percentage value, after measurements are taken at a standard radiation emission energy for a given energy source. Lower energy resolution values are very desirable, because they usually result in a higher quality radiation detector.

Various scintillator materials which possess most or all of these properties have been in use over the years. For example, thallium-activated sodium iodide (NaI(Tl)) has been widely employed as a scintillator for decades. Crystals of this type are relatively large and fairly inexpensive. Moreover, NaI(Tl) crystals are characterized by a very high light output.

Examples of other common scintillator materials include bismuth germanate (BGO), cerium-doped gadolinium orthosilicate (GSO), and cerium-doped lutetium orthosilicate (LSO). Each of these materials has some good properties which are very suitable for certain applications.

As those familiar with scintillator technology understand, all of the conventional materials possess one or more deficiencies, along with their attributes. For example, thallium-activated sodium iodide is a very soft, hygroscopic material, readily absorbing oxygen and moisture. Moreover, such a material produces a large and persistent after-glow, which can interfere with the intensity-counting system. Furthermore, the decay time of NaI(Tl), about 230 nanoseconds, is too slow for many applications. The thallium component may also require special handling procedures, in view of health and environmental issues.

BGO, on the other hand, is non-hygroscopic. However, the light yield of this material (15% of NaI(Tl)), is too low for many applications. The material also has a slow decay time. Moreover, it has a high refractive index, which results in light loss due to internal reflection.

While GSO crystals are suitable for some applications, their light yield is only about 20% of that obtained with NaI(Tl). Moreover, the crystals are easily-cleaved. It is therefore very difficult to cut and polish these crystals into any specific shape, without running the risk of fracturing the entire crystal.

The LSO materials also exhibit some drawbacks. For example, the lutetium element of the crystal contains a small amount of a natural, long-decay radioactive isotope, $Lu^{176}$. The presence of this isotope will provide a background count rate that can greatly interfere with highly-sensitive detector applications. Moreover, lutetium is very expensive, and has a relatively high melting point, which can sometimes make processing difficult.

The drawbacks of conventional scintillators for some applications have motivated researchers to develop new materials. Some of the new materials are described in two published patent applications for P. Dorenbos et al: WO 01/60944 A2 and WO 01/60945 A2. The references describe the use of cerium-activated lanthanide-halide compounds as scintillators. The first-mentioned publication describes the use of Ce-activated lanthanide chloride compounds, while the second publication describes the use of Ce-activated lanthanide bromide compounds. The halide-containing materials are said to simultaneously provide a combination of good energy resolution and low decay constants. Such a combination of properties can be very advantageous for some applications. Moreover, the materials apparently exhibit acceptable light output values. Furthermore, they are free of lutetium, and the problems sometimes caused by that element, described above.

The Dorenbos publications certainly seem to represent an advance in scintillator technology. However, such an advance is made against a background of ever-increasing requirements for the crystals. One example of an end use which has rapidly become more demanding is well-logging, mentioned above. In brief, scintillator crystals (usually NaI (Tl)-based) are typically enclosed in tubes or casings, forming a crystal package. The package includes an associated photomultiplier tube, and is incorporated into a drilling tool which moves through a well bore.

The scintillation element functions by capturing radiation from the surrounding geological formation, and converting that energy into light. The generated light is transmitted to the photo-multiplier tube. The light impulses are transformed into electrical impulses. Data based on the impulses may be transmitted "up-hole" to analyzing equipment, or stored locally. It is now common practice to obtain and transmit such data while drilling, i.e., "measurements while drilling" (MWD).

Those familiar with well-logging applications readily understand that scintillator crystals used for such a purpose must be able to function at very high temperatures, as well as under harsh shock and vibration conditions. The scintillator material should therefore have a maximized combination of many of the properties discussed previously, e.g., high light output and energy resolution, as well as fast decay times. (The scintillator must also be small enough to be enclosed in a package suitable for a very constrained space). The threshold of acceptable properties has been raised considerably as drilling is undertaken at much greater depths. For example, the ability of conventional scintillator crystals to produce strong light output with high resolution can be seriously imperiled as drilling depth is increased.

In view of this discussion, it should be readily apparent that new scintillator materials would be very welcome in the art, if they could satisfy the ever-increasing demands for commercial and industrial use. The materials should exhibit excellent light output, as well as relatively fast decay times. They should also possess good energy resolution characteristics, especially in the case of gamma rays. Moreover, the new scintillators should be readily transformable into monocrystalline materials or other transparent solid bodies. Furthermore, they should be capable of being produced efficiently, at reasonable cost and acceptable crystal size. The scintillators should also be compatible with a variety of high-energy radiation detectors.

BRIEF DESCRIPTION OF THE INVENTION

One embodiment of the present invention is directed to a scintillator composition which comprises a solid solution of at least two cerium halides.

Another embodiment relates to a radiation detector for detecting high-energy radiation. The detector comprises:

(a) a crystal scintillator which itself comprises a solid solution of at least two cerium halides, and any reaction products thereof; and (b) a photodetector optically coupled to the scintillator, so as to be capable of producing an electrical signal in response to the emission of a light pulse produced by the scintillator.

A method for detecting high-energy radiation with a scintillation detector constitutes an additional embodiment of the invention. The method comprises the following steps:

(A) receiving radiation by a cerium halide-based scintillator crystal, so as to produce photons which are characteristic of the radiation; and (B) detecting the photons with a photon detector coupled to the scintillator crystal;

wherein the scintillator crystal is formed of a composition comprising a solid solution of at least two cerium halides.

DETAILED DESCRIPTION OF THE INVENTION

Figure 1:
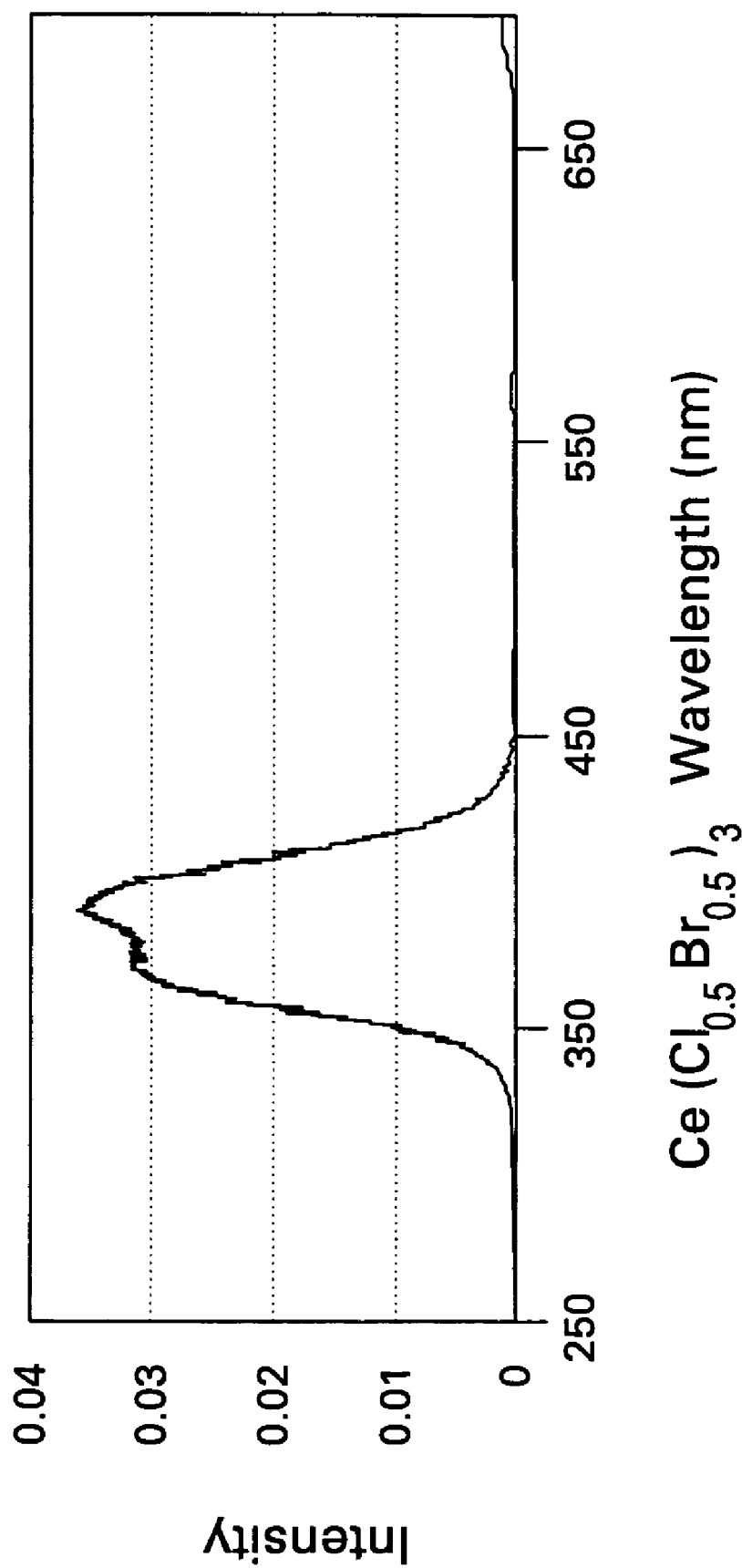
FIG. 1 is a graph of the emission spectrum (under X-ray excitation), for a scintillator composition according to an embodiment of the present invention.

The scintillator composition comprises a solid solution of at least two cerium halides. The halides are either bromine, chlorine, or iodine. As used herein, the term "solid solution" refers to a mixture of the halides in solid, crystalline form, which may include a single phase, or multiple phases. (Those skilled in the art understand that phase transitions may occur within a crystal after it's formation, e.g., after subsequent processing steps like sintering or densification).

In some embodiments, the solid solution comprises cerium chloride and cerium bromide. Both of these compounds are commercially available, and can also be made by known techniques. For example, cerium chloride (sometimes referred to as "cerous chloride") can be prepared by reaction of hydrochloric acid with either cerium carbonate or cerium hydroxide. Cerium bromide can be prepared in a similar fashion, e.g., reaction of cerium carbonate, cerium oxide (ceric oxide), or cerium hydroxide, with hydrobromic acid.

The ratio of cerium chloride to cerium bromide may vary considerably. For example, molar ratios in the range of about 1:99 to about 99:1 are possible. Very often, the molar ratio of cerium chloride to cerium bromide is in the range of about 10:90 to about 90:10.

The specific ratio of the two compounds will depend on various factors, such as the desired properties mentioned above, e.g., light output, and energy resolution. In some embodiments, the molar ratio is in the range of about 30:70 to about 70:30. However, it is thought that for certain applications, the solid solution should comprise a greater amount of cerium chloride, relative to cerium bromide, since the cerium chloride sometimes exhibits better luminescence characteristics. Thus, for example, the solid solution may comprise about 55 mole % to about 95 mole % cerium chloride, based on total moles of cerium chloride and cerium bromide. In some embodiments, for selected end uses, the solid solution comprises about 75 mole % to about 95 mole % cerium chloride.

The solid solution of cerium halides may further include cerium iodide. Like the other halides, cerium iodide is also commercially available, and can be prepared by known techniques. When used, cerium iodide should be substantially free of oxygen, or oxygen-containing compounds. As used herein, "substantially free" is meant to indicate a compound containing less than about 0.1 mole % oxygen, and, in some more specific embodiments, less than about 0.01 mole % oxygen.

Usually, the amount of cerium iodide present will range from about 0.1 mole % to about 20 mole %, based on total moles of cerium halide present in the composition. In some embodiments, the amount of cerium iodide present is in the range of about 0.1 mole % to about 10 mole %. The presence of cerium iodide can further enhance various properties, such as light output. (It should be understood that cerium iodide could be present with either cerium chloride or cerium bromide individually, but would frequently be present with a combination of the other two halides).

The scintillator composition may be prepared in several different forms. In some embodiments, the composition is in monocrystalline (i.e., "single crystal") form. Monocrystalline scintillation crystals have a greater tendency for transparency. They are especially useful for high-energy radiation detectors, e.g., those used for gamma rays.

However, the composition can be in other forms as well, depending on its intended end use. For example, it can be in powder form. It can also be prepared in the form of a polycrystalline ceramic. It should also be understood that the scintillator compositions may contain small amounts of impurities. As those skilled in the art understand, these impurities usually originate with the starting materials, and typically constitute less than about 0.1% by weight of the scintillator composition. Very often, they constitute less than about 0.01% by weight of the composition. The composition may also include parasitic phases, whose volume percentage is usually less than about 1%. Moreover, minor amounts of other materials may be purposefully included in the scintillator compositions, as taught in U.S. Pat. No. 6,585,913 (Lyons et al), which is incorporated herein by reference. For example, minor amounts of other rare earth oxides can be added to reduce afterglow. Calcium and/or dysprosium can be added to reduce the likelihood of radiation damage.

Those skilled in the art are familiar with methods for preparing the scintillator materials. The compositions are usually prepared by dry processes. (It should be understood that the scintillator compositions may contain a variety of reaction products of these processes). Some exemplary techniques for preparing the polycrystalline materials are described in the above-mentioned Lyons patent, as well as in U.S. Pat. Nos. 5,213,712 (Dole), and 5,882,547 (Lynch et al), which are incorporated herein by reference. Usually, a suitable powder containing the desired materials (e.g., the cerium halides themselves) in the correct proportions is first prepared, followed by such operations as calcination, die forming, sintering, and/or hot isostatic pressing. The powder can be prepared by mixing various forms of the reactants (e.g., salts, oxides, halides, oxalates, carbonates, nitrates, or mixtures thereof). Mixing can be carried out in the presence of a liquid such as water, an alcohol, or a hydrocarbon.

The mixing of the reactants (frequently the cerium halides themselves) can be carried out by any suitable means which ensures thorough, uniform blending. For example, mixing can be carried out in an agate mortar and pestle. Alternatively, a blender or pulverization apparatus can be used, such as a ball mill, a bowl mill, a hammer mill, or a jet mill. The mixture can also contain various additives, such as fluxing compounds and binders. Depending on compatibility and/or solubility, water, heptane, or an alcohol such as ethyl alcohol can sometimes be used as a liquid vehicle during milling. Suitable milling media should be used, e.g., material that would not be contaminating to the scintillator, since such contamination could reduce its light-emitting capability.

After being blended, the mixture can be fired in a furnace, under temperature and time conditions sufficient to convert the mixture into a solid solution. These conditions will depend in part on the specific type of matrix material and activator being used. In the case of powder reactants, firing will usually be carried out at a temperature in the range of about 500° C. to about 900° C. The firing time will typically range from about 15 minutes to about 10 hours.

Firing should be carried out in an atmosphere free of oxygen and moisture, e.g., in a vacuum, or using an inert gas such as nitrogen, helium, neon, argon, krypton, or xenon. Those skilled in the art are very familiar with techniques for preparing compositions while rigorously excluding oxygen and moisture. Some of the procedures are described in pending patent application Ser. No. 10/689,361, filed on Oct. 17, 2003 for A. Srivastava et al, which is incorporated herein by reference. However, various other procedures may be used. Those skilled in the art will be able to readily determine the most appropriate procedures and equipment for a given situation. After firing is complete, the resulting material can be pulverized, to put the scintillator into powder form. Conventional techniques can then be used to process the powder into radiation detector elements.

Methods for making the single crystal materials are also well-known in the art. A non-limiting, exemplary reference is "Luminescent Materials", by G. Blasse et al, Springer-Verlag (1994). Usually, the appropriate reactants are melted at a temperature sufficient to form a congruent, molten composition. The melting temperature will depend on the identity of the reactants themselves. The temperature is usually in the range of about 650° C. to about 1100° C.

Various techniques can be employed to form single crystals from the molten material. Some of these techniques are described in references such as U.S. Pat. Nos. 6,437,336 (Pauwels et al) and 6,302,959 (Srivastava et al); "Crystal Growth Processes", by J. C. Brice, Blackie & Son Ltd (1986); and the "Encyclopedia Americana", Volume 8, Grolier Incorporated (1981), pages 286–293. These descriptions are incorporated herein by reference. Non-limiting examples of the crystal-growing techniques are the Bridgman-Stockbarger method; the Czochralski method, the zone-melting method (or "floating zone" method), and the temperature gradient method. Those skilled in the art are familiar with the necessary details regarding each of these processes.

One non-limiting illustration can be provided for producing a scintillator in single crystal form, based in part on the teachings of the Lyons et al patent mentioned above. In this method, a seed crystal of the desired composition (described above) is introduced into a saturated solution. The solution is contained in a suitable crucible, and contains appropriate precursors for the scintillator material. The new crystalline material is allowed to grow and add to the single crystal, using one of the growing techniques mentioned above. The size of the crystal will depend in part on its desired end use, e.g., the type of radiation detector in which it will be incorporated.

The scintillator material can be prepared in other forms as well, by conventional procedures. For example, in the case of the polycrystalline ceramic form mentioned above, the scintillator material is first produced in powder form (or converted to powder form), as described previously. The material is then sintered to transparency by conventional techniques (e.g., in a furnace), at a temperature which is typically about 65% to 85% of the melting point of the powder. The sintering can be carried out under atmospheric conditions, or under pressure.

Another embodiment of the invention is directed to a method for detecting high-energy radiation with a scintillation detector. The detector includes one or more crystals, formed from the scintillator composition described herein. Scintillation detectors are well-known in the art, and need not be described in detail here. Several references (of many) which discuss such devices are U.S. Pat. Nos. 6,585,913 and 6,437,336, mentioned above, and U.S. Pat. No. 6,624,420 (Chai et al), which is also incorporated herein by reference.

In general, the scintillator crystals in these devices receive radiation from a source being investigated, and produce photons which are characteristic of the radiation. The photons are detected with some type of photodetector. (The photodetector is connected to the scintillator crystal by conventional electronic and mechanical attachment systems).

As mentioned above, the photodetector can be a variety of devices, all well-known in the art. Non-limiting examples include photomultiplier tubes, photodiodes, CCD sensors, and image intensifiers. Choice of a particular photodetector will depend in part on the type of radiation detector being fabricated, and on its intended use.

The radiation detectors themselves, which include the scintillator and the photodetector, can be connected to a variety of tools and devices, as mentioned previously. Non-limiting examples include well-logging tools and nuclear medicine devices (e.g., PET). The radiation detectors may also be connected to digital imaging equipment, e.g., pixilated flat panel devices. Moreover, the scintillator may serve as a component of a screen scintillator. For example, powdered scintillator material could be formed into a relatively flat plate which is attached to a film, e.g., photographic film. High energy radiation, e.g., X-rays, originating from some source, would contact the scintillator and be converted into light photons which are developed on the film.

Several of the end use applications should also be briefly discussed. Well-logging devices were mentioned previously, and represent an important application for these radiation detectors. The technology for operably connecting the radiation detector to a well-logging tube is known in the art. The general concepts are described in U.S. Pat. No. 5,869,836 (Linden et al), which is incorporated herein by reference. The crystal package containing the scintillator usually includes an optical window at one end of the enclosure-casing. The window permits radiation-induced scintillation light to pass out of the crystal package for measurement by the light-sensing device (e.g., the photomultiplier tube), which is coupled to the package. The light-sensing device converts the light photons emitted from the crystal into electrical pulses that are shaped and digitized by the associated electronics. By this general process, gamma rays can be detected, which in turn provides an analysis of the rock strata surrounding the drilling bore holes.

Medical imaging equipment, such as the PET devices mentioned above, represent another important application for these radiation detectors. The technology for operably connecting the radiation detector (containing the scintillator) to a PET device is also well-known in the art. The general concepts are described in many references, such as U.S. Pat. No. 6,624,422 (Williams et al), incorporated herein by reference. In brief, a radiopharmaceutical is usually injected into a patient, and becomes concentrated within an organ of interest. Radionuclides from the compound decay and emit positrons. When the positrons encounter electrons, they are annihilated and converted into photons, or gamma rays. The PET scanner can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes.

As alluded to previously, the light output of the scintillator is very important in both the well-logging and PET technologies. The present invention provides scintillator materials which can provide the desired light output for demanding applications of the technologies. Moreover, the crystals can simultaneously exhibit the other important properties noted above, e.g., short decay time, reduced afterglow, high "stopping power", and acceptable energy resolution. Furthermore, the scintillator materials can be manufactured economically, and can also be employed in a variety of other devices which require radiation detection.

EXAMPLES

The example which follows is merely illustrative, and should not be construed to be any sort of limitation on the scope of the claimed invention.

Three scintillator samples were prepared, and then examined for light output analysis. Each composition was prepared by dry-mixing various portions of cerium chloride and cerium bromide. (All materials were commercially-obtained). Mixing was carried out in an agate mortar and pestle. The uniform mixture was then transferred to an aluminum crucible, and fired at a temperature of about 600° C. The heating atmosphere was a mixture of 0.5% hydrogen and 99.5% nitrogen.

In sample A, the molar ratio of cerium chloride to cerium bromide was 50:50. In sample B, the molar ratio of cerium chloride to cerium bromide was 20:80. In sample C, the molar ratio of cerium chloride to cerium bromide was 10:90.

Figure 2:
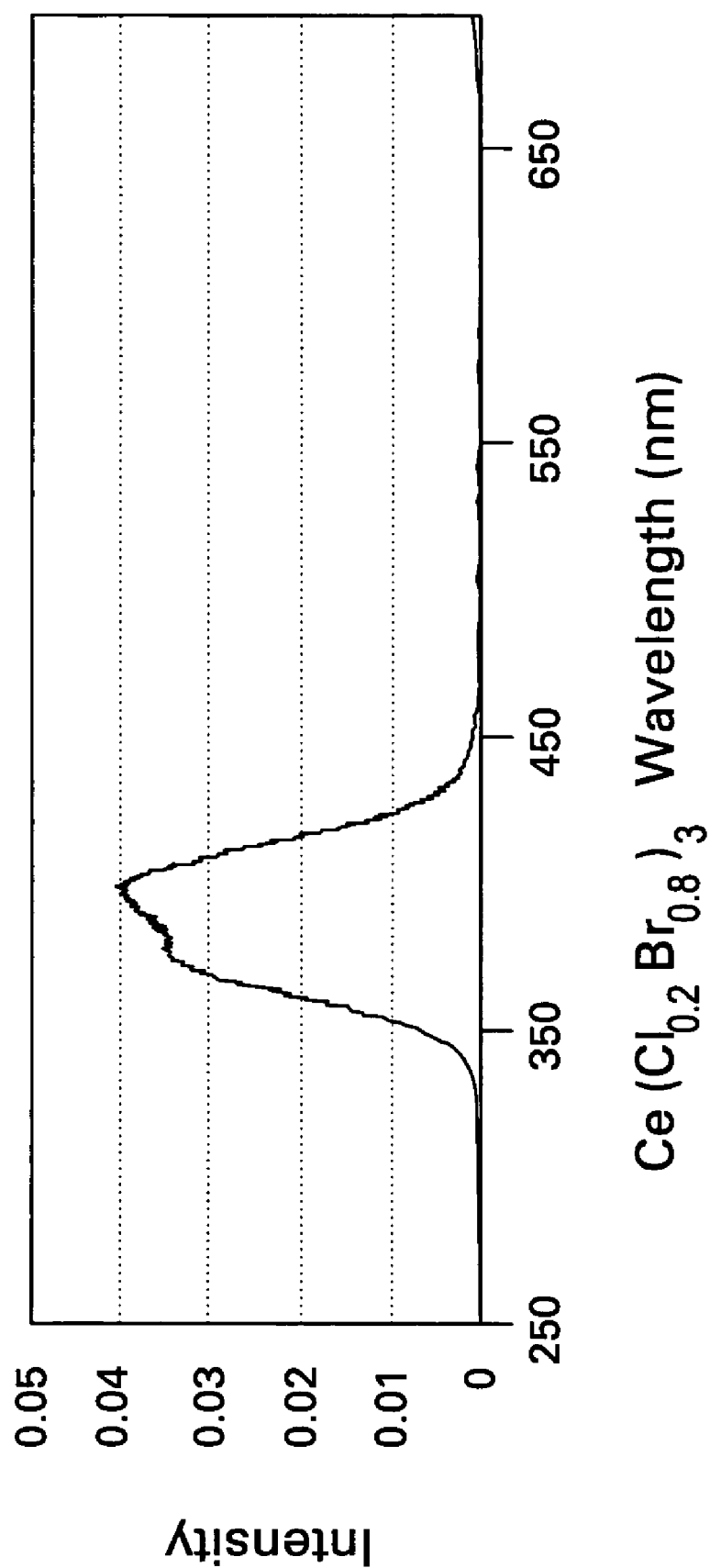
FIG. 2 is another graph of the emission spectrum (under X-ray excitation), for a scintillator composition according to an embodiment of the present invention.
Figure 3:
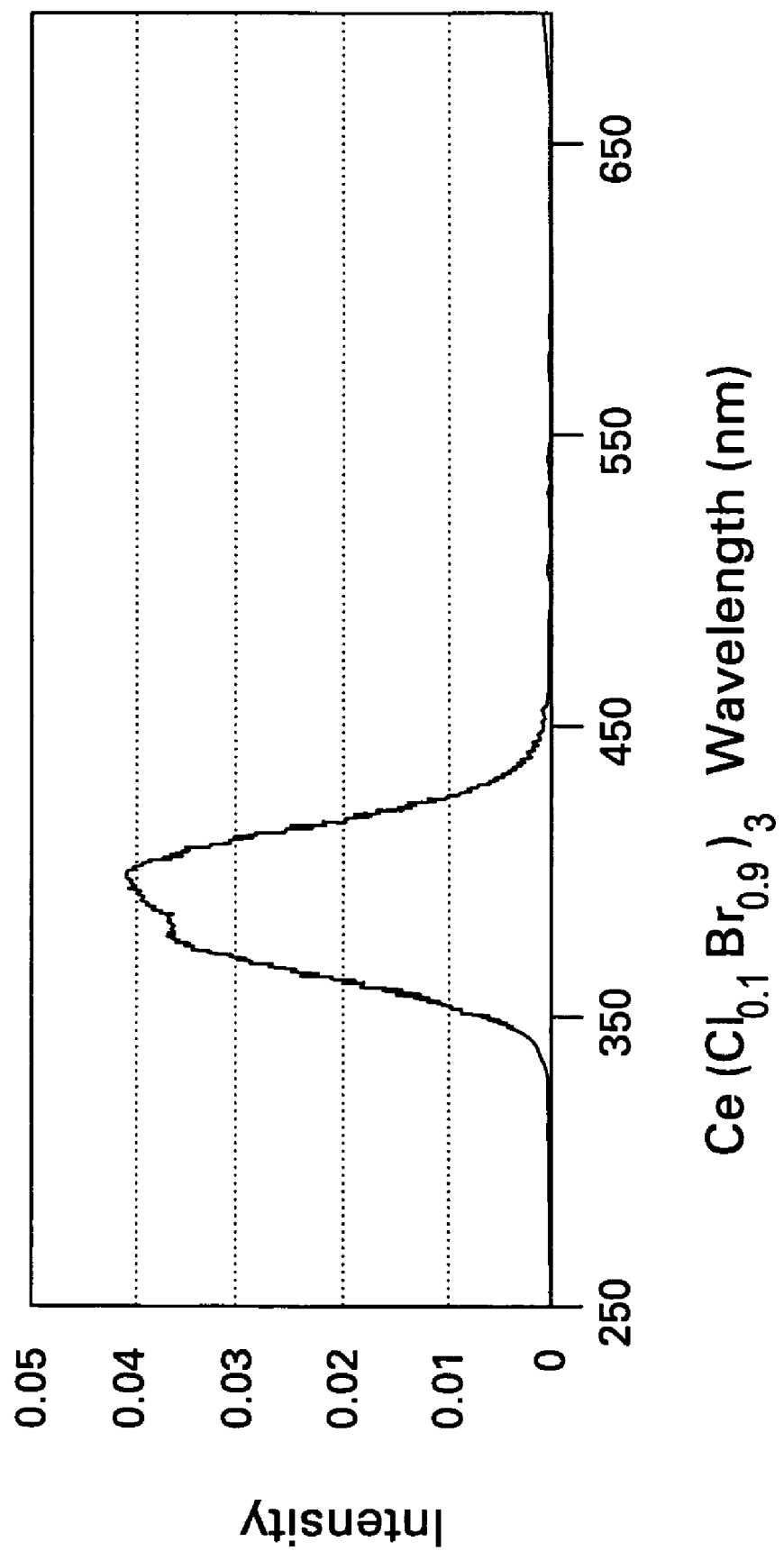
FIG. 3 is a third graph of the emission spectrum (under X-ray excitation), for a scintillator composition according to an embodiment of the present invention.

The emission spectrum for each sample was determined under X-ray excitation, using an optical spectrometer. FIGS. 1, 2 and 3 correspond to samples A, B and C. Each figure is a plot of wavelength (nm) as a function of intensity (arbitrary units). The peak excitation wavelength for sample A (FIG. 1) was about 400 nm. The peak excitation wavelength for sample B (FIG. 2) was about 410 nm. The peak excitation wavelength for sample C (FIG. 3) was about 405 nm.

The data which supports FIGS. 1–3 demonstrate that cerium can be excited by X-rays, over a range of chloride-bromide proportions in a cerium halide composition. Thus, it is also clear that cerium can be excited by gamma rays, to an emission level which is characteristic of the cerium ion. These emission characteristics are a clear indication that the cerium halide mixtures would be very useful as scintillator compositions, for detecting gamma rays by way of a variety of devices. Moreover, it should be noted that these scintillator compositions are self-activating. In other words, they don't require a separate activator compound, since cerium functions as both the activator (i.e., the emission source of the radiation measured by a scintillation detector) and a host element.

The foregoing description represents some of the embodiments of this invention. However, it is understood that various additions, modifications, and substitutions may be made therein, without departing from the spirit and scope of the invention. All of the patents, articles, and texts which are mentioned above are incorporated herein by reference.

What is claimed:

1. A self-activating scintillator composition, comprising a solid solution of at least two cerium halides.

2. The scintillator composition of claim 1, wherein the halide is selected from the group consisting of bromine, chlorine, and iodine.

3. The scintillator composition of claim 2, wherein the solid solution comprises cerium chloride and cerium bromide.

4. The scintillator composition of claim 3, wherein the molar ratio of cerium chloride to cerium bromide is in the range of about 1:99 to about 99:1.

5. The scintillator composition of claim 4, wherein the molar ratio of cerium chloride to cerium bromide is in the range of about 10:90 to about 90:10.

6. The scintillator composition of claim 3, comprising about 55 mole % to about 95 mole % cerium chloride, based on total moles of cerium chloride and cerium bromide.

7. The scintillator composition of claim 6, comprising about 75 mole % to about 95 mole % cerium chloride, based on total moles of cerium chloride and cerium bromide.

8. The scintillator composition of claim 3, further comprising cerium iodide.

9. The scintillator composition of claim 8, wherein the amount of cerium iodide present is in the range of about 0.1 mole % to about 20 mole %, based on total moles of cerium halide present in the composition.

10. The scintillator composition of claim 9, wherein the amount of cerium iodide present is in the range of about 0.1 mole % to about 10 mole %, based on total moles of cerium halide present in the composition.

11. The scintillator composition of claim 1, in substantially monocrystalline form.

12. The scintillator composition of claim 1, in polycrystalline form.

13. A radiation detector for detecting high-energy radiation, comprising:
   (a) a self-activating, crystal scintillator which itself comprises a solid solution of at least two cerium halides, and any reaction products thereof; and
   (b) a photodetector optically coupled to the scintillator, so as to be capable of producing an electrical signal in response to the emission of a light pulse produced by the scintillator.

14. The radiation detector of claim 13, wherein the solid solution comprises cerium chloride and cerium bromide.

15. The radiation detector of claim 14, wherein the photodetector is at least one device selected from the group consisting of a photomultiplier tube, a photodiode, a CCD sensor, and an image intensifier.

16. The radiation detector of claim 13, operably connected to a well-logging tool.

17. The radiation detector of claim 13, operably connected to a nuclear medicine apparatus.

18. The radiation detector of claim 13, operably connected to a digital imaging device.

19. The radiation detector of claim 13, operably connected to a screen scintillator.

20. A method for detecting high-energy radiation with a scintillation detector, comprising the steps of:
   (A) receiving radiation by a cerium halide-based, self-activating scintillator crystal, so as to produce photons which are characteristic of the radiation; and
   (B) detecting the photons with a photon detector coupled to the scintillator crystal;
   wherein the scintillator crystal is formed of a composition comprising a solid solution of at least two cerium halides.

21. The method of claim 20, wherein the solid solution of the scintillator crystal comprises cerium chloride and cerium bromide.

* * * * *